UNITED STATES PATENT OFFICE.

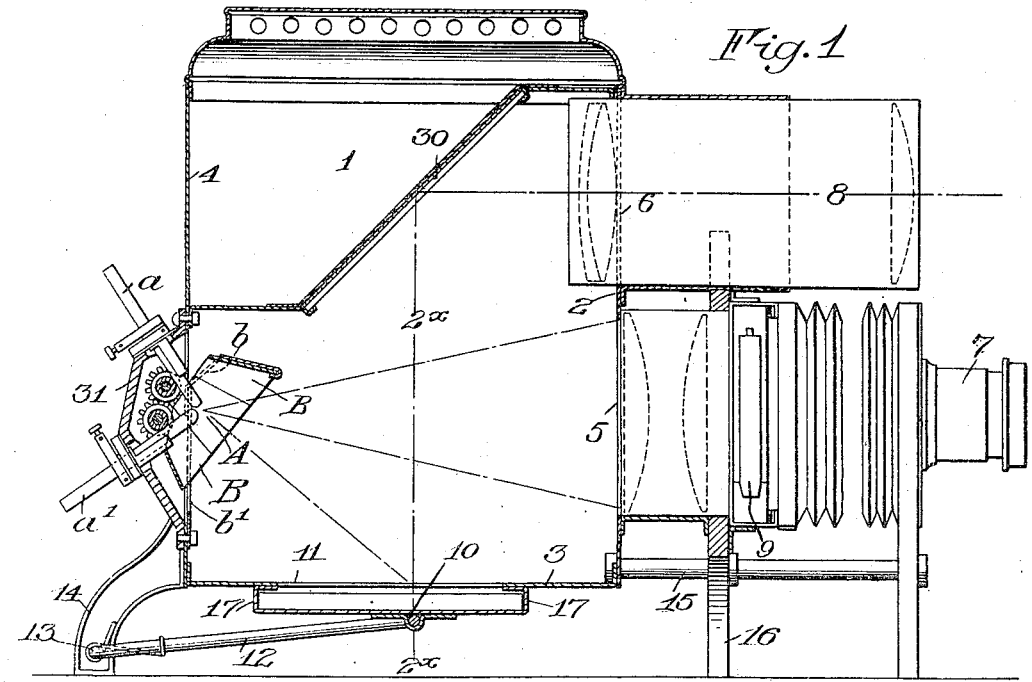

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

APPARATUS FOR PROJECTING IMAGES OF TRANSPARENT AND OPAQUE OBJECTS.

1,127,504.  Specification of Letters Patent.  Patented Feb. 9, 1915.

Application filed May 5, 1912. Serial No. 765,460.

*To all whom it may concern:*

Be it known that I, WILLIAM L. PATTERSON, of Rochester, in the county of Monroe and State of New York, have invented certain new and useful Improvements in Apparatus for Projecting Images of Transparent and Opaque Objects; and I do hereby declare that the following is a full, clear, and exact description of the same, reference being had to the accompanying drawings, forming a part of this specification, and to the reference-numerals marked thereon.

My invention has for its object to provide a simple apparatus comprising few parts adapted to be used for projecting upon a screen images of either transparent or opaque objects.

More specifically it may be stated that the object of my invention is to provide a projection apparatus by means of which the images of transparent or opaque objects may be projected without requiring the adjustment of a reflector or the manipulation of the source of illumination or other movable portions of the apparatus, these parts of the apparatus being arranged stationary relatively to the dark chamber and the desired projection being obtained by the positioning of the transparency in its holder relatively to one set of lenses and the opaque object in a separate holder relatively to a second set of lenses.

To these and other ends the invention consists in certain improvements and combinations of parts, all as will be hereinafter more fully described, the novel features being pointed out in the claims at the end of the specification.

In the drawings: Figure 1 is a vertical sectional view illustrating a projection apparatus constructed in accordance with my present invention, and Fig. 2 is an enlarged cross sectional view taken on the line $2^x$—$2^x$ of Fig. 1.

Similar reference numerals throughout the several figures indicate the same parts.

In the illustrations employed to show one embodiment of my invention the combined projection apparatus comprises the dark chamber or casing 1 which is preferably rectangular in form having the front wall 2, the bottom 3 and rear wall 4. In the front of the casing is provided the lower aperture 5 and the upper aperture 6 in alinement with which are arranged the lens systems 7 and 8, the former being adapted to project images of transparent objects, such as lantern slides placed in the holder 9, the latter being adapted to project images of opaque objects placed upon a holder 10. This holder is arranged horizontally of the plane of the axes of the lens systems. It is held against an aperture 11 in the bottom 3 of the dark chamber by a spring operated arm 12, the outer end of which is pivoted to a cross rod 13 held between the rear legs 14 of the casing, the latter being supported at its forward edge by the guide rods 15 and the legs 16 attached thereto. The opaque object holder is preferably constructed of sheet metal, the lateral edges of which are extended upwardly and bent inwardly to form guide channels 17 formed so as to receive slides which are rectangular, the insertion of one serving to eject the other. In an apparatus of this character the opaque objects projected thereby are principally picture postal cards and similar flat articles, and to this end there is arranged in the slides 19 and 20 suitable frames 21. The slides may be positioned on the holder as required whereby oblong articles, such as postal cards, may be present beneath the aperture 11 with their longer dimensions extending either transversely or longitudinally of the dark chamber, as may be desired by reason of the disposition of the subject matter thereon which is to be projected.

Above the holder 10 in the upper portion of the dark chamber 1 is rigidly mounted a reflector 30 disposed at a proper angle to receive rays of light reflected from objects placed on said holder and to deflect them into the lens system 8.

One of the features of my present invention comprises the arrangement and disposition of the source of illumination which, as before stated, is adapted to illuminate both the transparent and opaque objects, and in order to simplify the construction and provide a projection apparatus adapted for this combined use without requiring the adjustment of any movable parts, I have provided an arc lamp, the carbon elements of which are disposed so that the arc is form at the point, indicated by A, approximately in the axis of the transparent projection system of lenses 7. The lamp comprises the two carbons $a$, $a'$ arranged relatively to each other at an angle of 90° and adjustable by any suitable mechanism, so that their meeting ends may be brought into proximity and the arc formed at the point A. The pair of carbons thus arranged are supported on the frame 31 attached to the exterior of the wall 4 and forming, as it were, a protuberance on this wall of the dark chamber, the walls of said casing being preferably angular and so disposed that the carbons $a$, $a'$ are supported in such a position that a portion of the light rays from the arc are directed downwardly into the aperture 11 so that they will also illuminate an opaque object located in the holder 10.

Concentration of the rays of light admitted by the arc between the carbons $a$, $a'$ is obtained by means of a suitable reflector and in order to provide a simple, inexpensive structure which will serve to direct a portion of the light rays directly into the lens system 7 and a portion onto the opaque object holder 10, from which they are reflected into the lens system 8, so that the images formed by either of the sets of lenses will possess a satisfactory quality of illumination at a given distance, I employ a polygonal frusto pyramidal reflector B. This reflector is preferably made of metal and while it may be constructed of any desired number of faces I prefer to form it octagonal, as shown, and to polish its interior surfaces. This reflector is disposed in the position shown in Figs. 1 and 2 and is rigidly supported in a position substantially concentric to the arc supporting points of the carbons by means of upper and lower bracket pieces $b$, $b'$. The rear edges of the reflecting faces of the octagonal reflector lie in rear of the arc and the reflector, as a whole, is inclined forwardly, the several reflecting surfaces about its upper edge serving to collect and direct some of the rays of light in a downward direction onto the opaque object holder while other rays are cast forwardly in the line of the axis of the transparent projecting system of lenses 7.

A projecting apparatus embodying my invention is simple in construction comprising but few parts and as none of these need be adjusted it is especially adapted for use by unskilled operators. A further advantage also exists in the arrangement of the parts as disclosed since, if desired, images of transparencies and opaque objects may be projected simultaneously.

I claim as my invention:

1. A projection apparatus comprising a casing and two systems of projecting lenses, a holder for transparent objects in front of one lens system, a holder for opaque objects at one side of the casing and a reflector located in alinement therewith and directing light rays reflected therefrom into the other lens system and a source of illumination disposed to direct light rays emitted therefrom onto both of said object holders.

2. A projection apparatus comprising two systems of projecting lenses, a dark chamber, a holder for opaque objects at one side of the axes of the lens systems, a source of light disposed to direct rays of light into one lens system and onto said object holder, a reflector in alinement with the other lens system and positioned to receive the reflected light rays from the opaque object holder.

3. In a projection apparatus, the combination with two parallel lens systems, a dark chamber, an opaque object holder arranged in the plane of the axes of said lens systems at one side of the casing and a reflector in alinement with said holder and the lens system which is farthermost relatively to said holder, of a source of illumination disposed to cast light rays onto said holder and into the lens system adjacent thereto.

4. In a projection apparatus, the combination with a dark chamber, two parallel systems of projection lenses opening out of the front of the chamber and an opaque object holder at one side of the chamber arranged in the plane of the axes of said lens systems, of a reflector in line with the holder and the axis of the lens system farthermost therefrom and a fixed source of light located in rear of and between the holder and reflector and disposed to cast the rays of light emitted therefrom onto the holder and into the adjacent system of lenses.

5. In a projection apparatus, the combination with a dark chamber casing, upper and lower sets of projection lenses in the front wall of the casing, an opaque object holder in the bottom of the casing and a reflector in the top of the chamber receiving light rays reflected from the holder and directing them into the upper lenses, of a source of light at the rear of the chamber arranged to illuminate simultaneously the lower lenses and the opaque object holder and a holder for supporting transparent objects in line with the lower lenses.

6. In a projection apparatus, the combination with a source of light and two systems of lenses one for projecting images of transparent objects by direct illumination, the other for projecting images of opaque objects by reflected rays of light, and an opaque object holder and reflector coöperating with the last mentioned lens system for this purpose, of a reflector surrounding said light source and disposed at an angle to the axis of the first mentioned lens system and to the opaque object holder for directing the light rays into said lens system and onto the object holder.

7. In a projection apparatus, the combination with the carbons of an arc lamp and two systems of lenses one for projecting images of transparent objects, the other for projecting images of opaque objects and an object holder and reflector coöperating to reflect light rays into the last mentioned lens system, of a frusto-pyramidal reflector surrounding the arc supporting ends of the lamp carbons and disposed at an angle relatively to the first mentioned lens system and said opaque object holder to direct a portion of the light rays into said lens system and a portion onto the object holder.

8. In a projection apparatus, the combination with a source of illumination and two lens systems, one for projecting images of transparent objects by light rays direct from said source and the other for projecting images of opaque objects by light rays which are reflected, and an object holder and a reflector arranged to coöperate for this purpose, of a polyangle pyramidal reflector surrounding the source of illumination and arranged in the axis of the first mentioned lens system and inclined relatively thereto and to the opaque object holder.

WILLIAM L. PATTERSON.

Witnesses:
RUSSELL B. GRIFFITH,
H. E. STONEBRAKER.